Sept. 21, 1965    W. B. KIMBRELL ETAL    3,207,537
PIPE CONNECTIONS
Filed March 16, 1964    2 Sheets-Sheet 1

Willard B. Kimbrell
Sol B. Kimbrell
INVENTORS

BY Murray Robinson

ATTORNEY

Sept. 21, 1965 W. B. KIMBRELL ETAL 3,207,537
PIPE CONNECTIONS
Filed March 16, 1964 2 Sheets-Sheet 2

Willard B. Kimbrell
Sol B. Kimbrell
INVENTORS

BY Murray Robinson

ATTORNEY

# United States Patent Office 3,207,537
Patented Sept. 21, 1965

3,207,537
PIPE CONNECTIONS
Willard B. Kimbrell, Wichita, and Sol B. Kimbrell, Great Bend, Kans., assignors to K & E Industries, Inc., Wichita, Kans., a corporation of Kansas
Filed Mar. 16, 1964, Ser. No. 351,902
2 Claims. (Cl. 285—353)

This application is a continuation-in-part of our prior copending United States patent application Serial No. 253,658, filed January 24, 1963, entitled "Pipe Connection." This invention pertains to pipes and pipe connectors. It is especially adapted for use with thin walled pipe.

It is not commercially practical to cut a thread on thin walled pipe whereby a threaded coupling could be used to connect two pipes, e.g. as in home water pipes. Likewise, it is not commercially practical to connect thin walled pipes by welding as is done in transmission line pipes of large size.

In considering what constitutes thin walled pipe one may refer to the gage number of the sheet metal from which the pipe is made, as set forth at pages 438 et. seq. of Machinery's Handbook, 15th Edition, published by The Industrial Press. A pipe made of #14 gage sheet metal which has a wall thickness of 0.083 inch on the Birmingham or Stubs Iron Wire Gage would be a typical thin walled pipe. Cutting a thread on such a pipe would make it too weak, and welding such pipe without burning it would be difficult. It might be possible to cut a satisfactory thread on a #8 B. or S. gage pipe having a wall thickness of 0.165 inch if the sheet were of extra high quality as required for high pressure, but not on lower quality sheet used for low pressure pipe. Therefore #8 gage pipe may be considered as transitional between thin walled and thick walled pipe, and all higher gage numbers would be classified as thin walled.

The invention is applicable to pipe for both low pressure, e.g. below 600 p.s.i., and higher pressures. It is applicable to both ferrous (e.g. steel) and non-ferrous (e.g. aluminum) pipe.

According to the invention two thin walled pipes are connected by means of a threaded union. The union box has an inturned flange at one end which is fixedly secured between two external upsets on one pipe end both of which are spaced axially from the end fact of the pipe. The union pin is a ring rotatably mounted on the other pipe end and axially slidable between two axially spaced external upsets on the other pipe end, one of which is at the extreme end of the pipe forming an enlarged end face. A solid rubber or other elastomer seal ring is disposed in the annulus between the union box and the pipe end on which the box is affixed, being snapped into position past the thread in the box. The box preferably has a tapered portion converging toward the flange end thereof so that when the rubber ring is pressed axially toward the flange end or bottom of the box the rubber ring is radially compressed to seal tightly against the pipe end. The box extends beyond the end of the pipe to which it is secured so that other pipe end can be inserted therein with its end face upset pushing axially against the rubber seal ring. In this position the union pin can be moved axially into the box and rotated to engage its screw thread with that of the box. A shoulder on the pin engages the mouth of the box to limit engagement thereof. In this position the pin will bear against the end face upset on one side thereof and the other side of the end face upset will bear against the rubber seal ring to press it into the annulus between box and pipe end.

Among the advantages of the invention are the strength of the connection (there being no cutting into the pipe ends), the excellent seal provided, the full opening through the connection, the shielding of the seal ring against damage by cleaning tools, line fluid and other material passing through the pipe connection, the ability of the connection to be made up without rotating the pipe (which may be a problem with crooked pipe), the possibility of applying the holding wrench to the pipe rather than the union box during making up (because of their fixed relationship), the prevention of loss of the union parts which are both secured to the pipe ends by upsets and of the seal ring which is retained in the annulus between box and pipe end by the box threads, the protection of the pin by virtue of its being disposed entirely on the pipe without any portion extending beyond the pipe end, and the speed with which the connection can be made.

The rubber seal ring is of sufficient axial extent to prevent the end faces of the pipes from abutting, which is important to protect the lining of lined pipe. With a connection according to the invention, the rubber seal ring cooperates with the rubber lining of the pipe to keep line fluid from contacting any metal.

The invention is especially suitable for temporary pipe lines used in connection with a rotary drilling rig where a rugged connection that can be quickly made up and broken apart is especially desirable.

Other advantages and objects of the invention will appear from the following description of preferred embodiments thereof, reference being made to the accompanying drawings wherein.

Figure 1:
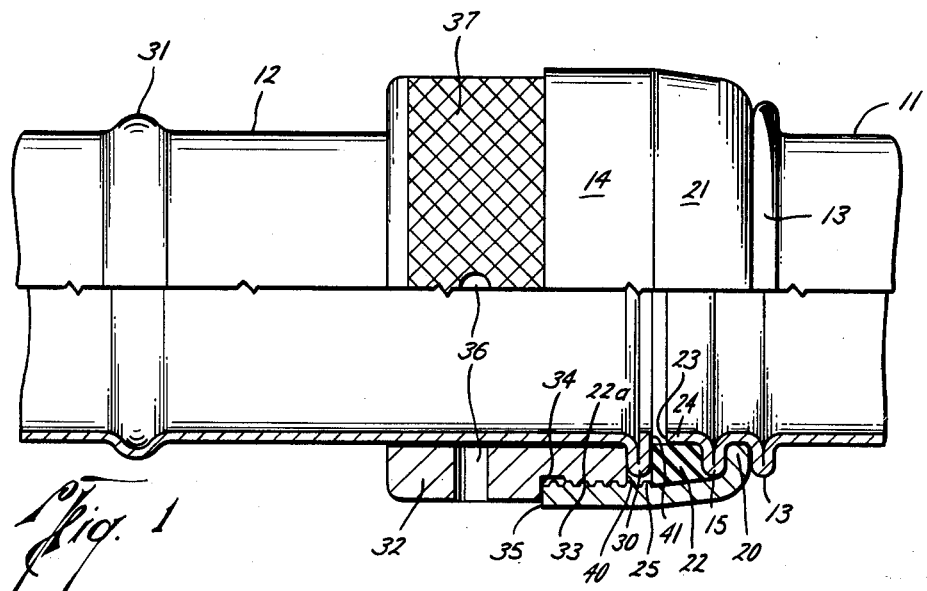
FIGURE 1 is an elevation, partly in section, showing the connection of the two pipes according to the invention.

Referring first to FIGURE 1, there are shown two pipe ends 11, 12. Pipe end 11 has been externally upset by axially loading same while a mandrel on the inside prevents internal collapse and with a set of dies therearound to form an external flange 13. This operation is preferably performed with the pipe cold, i.e. below the plastic temperature, so that the flange is formed by the pipe wall buckling and bending outwardly as shown, rather than by a simple thickening of the pipe wall as would occur if the pipe were at a plastic temperature. The upset flange according to the aforementioned process may be termed a buckled flange to distinguish it from a flange formed by plastic flow and wall thickening.

The above described cold process enables a flange of considerable radial extent to be formed readily without any expensive equipment, and the resulting flange is of great strength due to the cold working and the absence of any sharp corners on the outside of the pipe which might produce stress concentrations.

After flange 13 has been formed, union box 14 is placed on pipe end 11 against flange 13 and flange 15 is formed in a manner similar to flange 13. The procedure can be reversed with flange 15 formed first, the union box slipped over the other end of the pipe, and then flange 13 formed, but with a thirty foot length of pipe, as is usual, the first procedure is preferred.

The union box 14 is formed from a length of resistance welded steel tubing by first boring or turning the ends to a larger internal diameter, leaving a smaller diameter portion therebetween which is then threaded. After the thread is formed, the flange 20 is formed by upsetting the end of the tube by applying axial loading with a mandrel inside the tube and forming dies on the outside.

The conically tapered portion or bottom 21 of the box is formed at the same time.

The thread 22A formed inside the union box is preferably one having a flat crest, which is not easily damaged, and steep thread flanks to permit a low pitch useful to retain the rubber seal ring 22 as will be explained. A stub Acme thread as shown at page 994 of Machinery's Handbook is suitable.

The flange 15 on the box pipe end 11 is axially spaced from the end face 23 and the threaded portion of the box begins beyond the end face 23 so that there is formed an annulus between the box bottom 21 and the pipe tip 24 that extends from flange 15 to end face 23. The rubber seal ring 22 is pushed into this annulus and retained in position by the end turn 25 of thread 22. Because the thread has a flat crest and a low pitch, e.g. four turns per inch, the thread runout 25 presents a right angle shoulder extending almost 360 degrees. The runout 25 is axially spaced a short distance from the end face 23 and the rubber seal ring 22 extends beyond the end face 23 an equal amount so as to engage thread runout 25.

Pipe end 12 is upset to provide a flange 30 and a bead 31, preferably by cold upsetting similarly to the process by which flanges 13 and 15 were formed. The upsets (flange 30 and bead 31) on pipe end 12 are preferably formed one at a time, the bead 31 being formed first and then after pin ring 32 has been slipped over the pipe end, flange 30 is formed at the extremity of the pipe. However, the process could be reversed, flange 30 being formed first, then the pin ring applied, and the bead 31 formed. In fact, the pin ring could be put on the pipe before either upset was formed and then the upsets could be formed simultaneously or in any order. This procedure would also be applicable to the box ring 21 and flanges 13 and 15 which could be formed after the box ring 21 was put on the pipe and formed simultaneously or in any order.

The union pin, i.e. pin ring 32, is provided with a thread 33 on one end. Thread 33 is correlative to thread 22A on the union box (box ring 21). The other end of the pin is of larger diameter than the threaded end, providing a shoulder 34 therebetween to engage the end face 35 of the box and thereby limit the degree of engagement of pin and box.

There are a plurality of radial holes 36 in the larger end of the pin for engagement with a lug wrench. The exterior surface 37 of the larger end of the pin is knurled to facilitate manual rotation of the pin into initial engagement with the box.

The length of the pin 32 is less than the distance between flange 30 and bead 31 by an amount at least as great as the distance from the end face 40 of the pin to the shoulder 34 so that the pipe end 12 can be fully inserted into the box 14 before any make up of the pin into the box. This facilitates proper engagement of the seal ring 22 and the enlarged pipe end face 41 provided by the side of flange 30 which is at the extremity of pipe end 12.

When the pin is screwed into the box after initial engagement of pipe end 12 in the box, the end face 41 presses the seal ring 22 into the tapered bottom of the box, thereby radially compressing it against the pipe tip 24 to seal therewith, while end face 41 seals against ring 22 by axial compression thereof.

Figure 2:
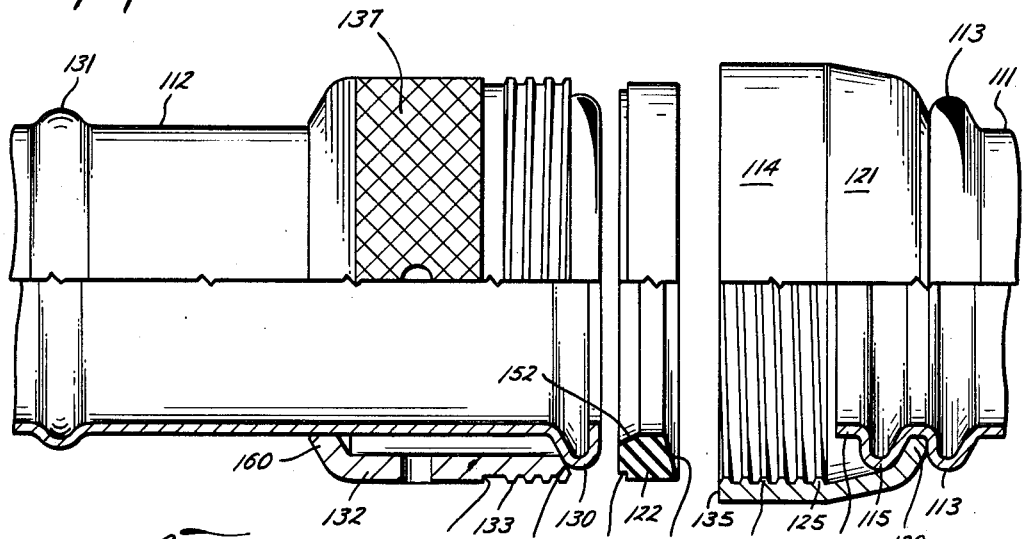
FIGURE 2 is an expoded view otherwise similar to FIGURE 1 showing a modified form of the invention.

Referring now to FIGURE 2, the construction there shown is substantially the same as that of FIGURE 1 and like parts are given the same reference numbers plus 100.

The principal difference between the FIGURE 1 and FIGURE 2 construction is that in the latter the buckled flanges 113, 115, and 130 are interiorly open rather than having the adjacent walls thereof abutting face to face as in buckled flanges 13, 15, and 30. Also the inner wall of each flange 113, 115, 130, that is, the wall farthest from the adjacent pipe end, is disposed at an angle to the pipe axis so as to flare toward the adjacent pipe end. The flange 120 on the union box 114 is similarly flaring to the inner wall of flange 113 so as to be in full contact therewith, and there may be slight flare on the outer wall of flange 113 sufficient to engage box flange 120 for a part of its radial extent. In any event, box flange 120 is fixedly held between flanges 113 and 115.

The outwardly flaring inner walls of the flanges 113, 115, 130 gives the open buckled flanges greater strength to resist axial loading than would be had if the walls of the open flange were parallel, i.e. if the flange were of U-shaped cross-section.

The open buckled flanges of the FIGURE 2 construction require less metal distortion to form them than the closed buckled flanges of the FIGURE 1 construction. This reduces the number of rejects during manufacture based upon cracking of the metal at the flange, and this also reduces the possibility of failure in the field due to overstressing of the flanges.

Figure 3:
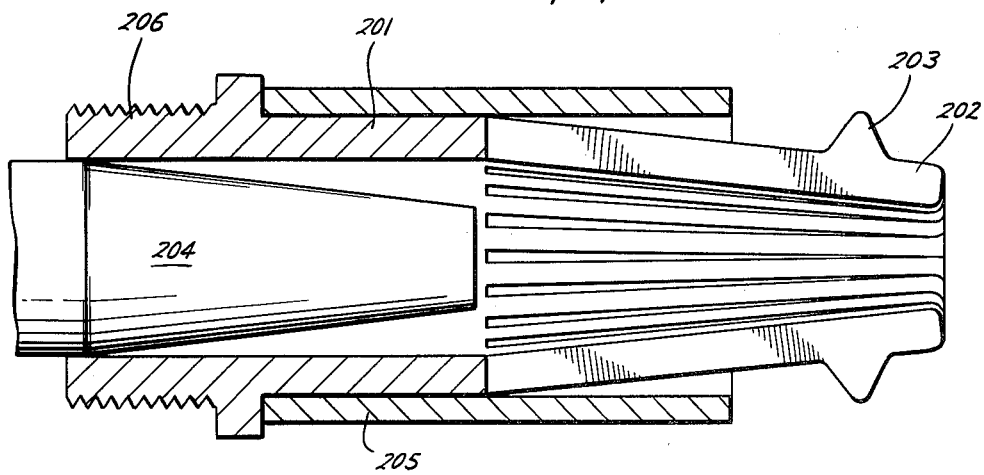
FIGURES 3 and 4 are respectively an axial section and an end view of a tool suitable for manufacture of the FIGURE 2 embodiment of the invention.
Figure 4:
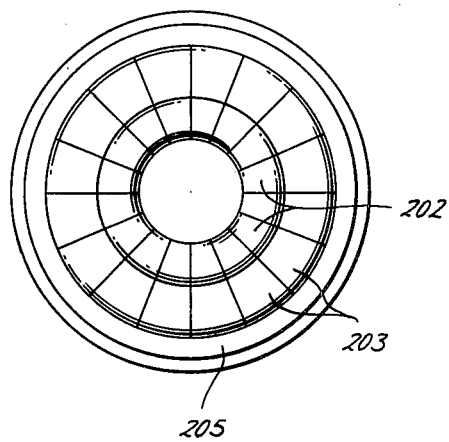

In order to secure union box flange 120 between the adjacent walls of flanges 113 and 115 without closing the flanges, the internal expander shown in FIGURES 3 and 4 is provided. This tool is also used to form the annular bead 131 that retains the union pin. Tube 201 is made of spring steel and is sloted to form sixteen expanding fingers 202. Each finger carries a die 203 correlative to the inner surface of the flange or bead to be formed. Tapered mandrel 204 is movable axially in tube 201 to expand fingers 202. Spacer sleeve 205 is provided to locate the pipe when it is positioned over fingers 202 so that the flange or bead will be formed at the desired distance from the end of the pipe. Different length spacer sleeves will be used to make differently located flanges and beads. To actuate the tool, the threaded part 206 of the tube is connected to the body of a hydraulic cylinder and mandrel 204 is connected to the piston rod of the cylinder. The pipe to be formed is placed over the end of fingers 202 against the end of spacer sleeve 205. The cylinder is then supplied with fluid under pressure to move the mandrel into the tube to expand fingers 202.

Referring again to FIGURE 2 another difference from the FIGURE 1 construction lies in the cross-sectional shape of the seal ring 132. The inner end 150 of the ring lies at an angle to axis thereof, flaring toward the inner end of the ring which lies against flange 115 when the connection is made up. This provides an internal acute angle at the outer periphery of the ring which fits better against the outer wall of flange 115. There is thus less likelihood of the seal ring being pinched and damaged during make up, whereby the ring can be used again after the connection has been disconnected.

The outer end of the seal ring is provided with internal and external annular rabbets 152, 153 leaving an end face therebetween of reduced radial extent. This concentrates the force of make up to increase the pressure between the seal ring and flange 120, thereby enhancing the seal therebetween.

A further feature of the FIGURE 2 construction departing from that of FIGURE 1 is the union pin 132. Like box 114 the union pin 132 is formed of lighter gage tubular stock than pin 32 of the FIGURE 1 construction. It is formed in a manner similar to the union box of both FIGURES 1 and 2, the end flange 160 being turned in from tubular stock of initially uniform diameter. The body of pin 132 is thus spaced radially from pipe 112 by flange 160. The end 161 of pin 132 is bevelled to conform to the flaring inner wall of flange 161.

The tubular union pin 132 has the advantages of lighter weight and lower material cost.

Except for the three points of difference discussed above, the FIGURE 2 embodiment is the same as that of FIGURE 1. Similarly to the FIGURE 1 embodiment, shoulder 134 on the pin 132 engages end face 135 of the box when the connection is made up. In this position the flange 130 presses flange 115 against seal ring 122. Similarly to the FIGURE 1 embodiment, seal ring 122 is radially compressed by the tapered bottom 121 of the box so as to seal against pipe tip 124, while the seal ring 122 is axially compressed to seal against flange 130.

In practicing the invention of both the FIGURE 1 and FIGURE 2 embodiments it is to be understood the pipes will be manufactured having on each length thereof a box union at one end and a pin union on the other whereby each end of the pipe can be connected to the correlative end of a like pipe.

Although preferred embodiments of the invention have been shown and described, many modifications thereof can be made by one skilled in the art without departing from the spirit of the invention, and it is intended to protect by Letters Patent all forms of the invention falling within the scope of the following claims.

We claim:

1. A thin walled pipe, an annular union box surrounding one end of the pipe, said box being made of tubing, one end of said tubing having an inwardly upset flange flaring toward the adjacent end of the pipe, said ppie having adjacent said one end a pair of external upset flanges between which said inwardly upset flange of the box is held fixedly against both rotation and axial motion, each external flange including one wall extending perpendicular to the pipe axis and one wall flaring toward the end of the pipe with a curved outer peripheral portion joining the outer ends of said walls, the perpendicular wall of each external flange being closer to the end of the pipe than the flaring wall of the flange, the inwardly upset flange being captured between the flaring wall of one external flange against which it lies and the perpendicular wall of the other external flange, said external flange being spaced axially from the end face of said one end of the pipe leaving a tip therebetween, said box having an unthreaded portion adjacent said inwardly upset flange, said unthreaded portion including a tapered bottom converging toward said inwardly upset flange, said box having an internally threaded portion adjacent said unthreaded portion, said threaded portion having a flat crested thread with steep flanks and the thread runout adjacent said unthreaded portion providing a right angle shoulder spaced axially beyond said end face of the pipe, said shoulder and said bottom of the box and said tip of the pipe end together with said perpendicular wall and curved outer peripheral portion of the external flange nearest said end face of the pipe forming an annulus, an elastomer seal ring in said annulus captured at its ends between said shoulder and the last said perpendicular wall and held peripherally between said tip and said tapered bottom, said seal ring having an annular outer edge adapted to be received in the annular crevice formed between said bottom of the box and said curved outer peripheral portion of the last said external flange, the other end of said pipe having a pair of axially spaced annular externally projecting portions, and an annular union pin axially slidably mounted on said other end of the pipe between said projecting portions, said pin being made of tubing and including a body portion whose inner diameter is larger than the outer diameter of said pipe end but smaller than the outer diameter of said annular projecting portions of the pipe, said pin further including an inwardly upset flange at the end thereof farthest from the extremity of said other end of the pipe, said pin flange fitting closely but freely around said other end of the pipe, the one of said annular projecting portions nearest said pipe end extremity being a radially extending flange against which the adjacent end of the union pin may bear, said pin having adjacent said end of the pin a portion threaded correlative to said box thread and of larger crest diameter than the diameter of said flange, said pin having adjacent said threaded portion a larger diameter unthreaded portion, there being a shoulder between said threaded and unthreaded portions.

2. A pipe having an annular union box at one end and an annular union pin at the other end, said box having an inturned radial flange and said pipe having at said one end a pair of external upset buckled flanges between which said radial flange of the box is held fixedly against both axial motion and rotation, said buckled flanges being spaced axially from the end face of said one end of the pipe leaving a tip therebetween, said box having an unthreaded portion adjacent said inturned flange, said unthreaded portion including a tapered bottom converging toward said inturned flange, there being a rubber seal ring disposed in the annulus between said unthreaded portion and said tip, said box having a threaded portion adjacent said unthreaded portion, said threaded portion having a flat crested thread with steep flanks and the thread runout adjacent said unthreaded portion providing a right angle shoulder spaced axially beyond said end face of the pipe, said rubber ring abutting said shoulder, said other end of the pipe having a pair of axially spaced annular outwardly projecting portions between which said pin is rotatably and axially slidably disposed, the one of said projecting portions nearest the end face of said other pipe end being disposed at the extreme end thereof and comprising an externally upset buckled flange, one end of said pin being adapted to bear against said flange, a portion of said pin adjacent said one end of the pin being threaded correlative to the box thread, the crest diameter of the pin thread exceeding the diameter of said flange on said other end of the pipe, said pin having a larger diameter portion adjacent said threaded portion, there being a shoulder formed therebetween adapted to engage the end face of a box like said box but on another piece if pipe in which position said one of said outwardly projecting portions is adapted to engage the rubber seal ring like said seal ring but on said other piece of pipe and compress same axially to form a seal therewith and to force same into the tapered bottom of a box like said box but on said other piece of pipe to compress the seal ring radially inwardly to seal with the tip of said other pipe.

References Cited by the Examiner

UNITED STATES PATENTS

| 1,533,886 | 4/25 | Mueller | 285—382.5 X |
| 2,236,967 | 4/41 | Couty | 285—356 X |
| 2,415,472 | 2/47 | Dorman | 285—356 X |
| 2,463,336 | 3/49 | Weatherhead | 285—234 X |
| 2,485,960 | 10/49 | Donahue | 285—382.5 |
| 2,589,876 | 3/52 | Sesher | 285—368 X |
| 3,058,761 | 10/62 | Christophersen | 285—349 |

FOREIGN PATENTS

| 410,208 | 3/10 | France. |
| 690,552 | 4/40 | Germany. |
| 817,544 | 10/51 | Germany. |
| 828,117 | 1/52 | Germany. |
| 864,491 | 1/53 | Germany. |
| 224,021 | 11/24 | Great Britain. |
| 406,764 | 3/34 | Great Britain. |
| 453,217 | 3/36 | Great Britain. |

CARL W. TOMLIN, *Primary Examiner.*

THOMAS F. CALLAGHAN, *Examiner.*